(12) United States Patent
Kambe et al.

(10) Patent No.: US 6,242,067 B1
(45) Date of Patent: Jun. 5, 2001

(54) OPTICAL RECORDING MEDIUM

(75) Inventors: Emiko Kambe; Atsushi Monden, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/420,941

(22) Filed: Oct. 19, 1999

(30) Foreign Application Priority Data

Oct. 19, 1998 (JP) .................................................. 10-315391
Oct. 12, 1999 (JP) .................................................. 11-289341

(51) Int. Cl.$^7$ ...................................................... B32B 3/02
(52) U.S. Cl. ....................... 428/64.1; 428/64.4; 428/64.8; 428/913; 430/270.16; 430/270.18; 430/270.2; 430/495.1; 430/945
(58) Field of Search ................................ 428/64.1, 64.2, 428/64.4, 64.8, 913; 430/270.14, 270.16, 270.2, 495.1, 945

(56) References Cited

U.S. PATENT DOCUMENTS 5,851,621 * 12/1998 Wolleb ................................ 428/64.1

FOREIGN PATENT DOCUMENTS

| 2-55189 | 2/1990 | (JP) . |
|---|---|---|
| 3-51182 | 3/1991 | (JP) . |
| 7-44904 | 2/1995 | (JP) . |
| 7-37580 | 4/1995 | (JP) . |
| 8-099467 | 4/1996 | (JP) . |
| 8-108623 | 4/1996 | (JP) . |
| 10-097732 | 4/1998 | (JP) . |
| WO98/29257 | 7/1998 | (WO) . |

* cited by examiner

*Primary Examiner*—Elizabeth Evans
(74) *Attorney, Agent, or Firm*—Oblon, Spivak, McClelland, Maier & Neustadt, P.C.

(57) ABSTRACT

In an optical recording medium using writing and reading light having a wavelength of up to 690 nm and having a recording layer and preferably a reflective layer, the recording layer contains a chelate compound having an azo compound of specific structure as a ligand (i.e., azo metal complex dye). This results in an optical recording medium of the heat mode having advantages including the dye's sufficient solubility in a coating solvent which does not attack polycarbonate substrates and improved write/read characteristics with light having a wavelength of up to 690 nm.

7 Claims, 1 Drawing Sheet

OPTICAL RECORDING MEDIUM

BACKGROUND OF THE INVENTION

1. Technical Field

This invention relates to an optical recording medium capable of writing and reading operation at a wavelength of up to 690 nm and having a recording layer and preferably a reflective layer, wherein pits are formed by irradiating a laser beam.

2. Background Art

The inventors have been engaged in the development of write-once compact discs (CD-R) as an optical recording medium capable of recording in conformity with the compact disc (CD) standard. The CD-R has on a substrate provided with a guide groove, a light recording layer of organic dye compound, a light reflecting layer of metal, and a protective layer of UV-cured resin and is capable of writing and reading operation with a laser beam of 780 nm wavelength.

In the recent years, there is a desire to have a higher density recording medium. It is a write-once digital video disc (DVD-R) which is arrived at by reducing the writing wavelength to 635 nm and the reading wavelength to 650 nm from the writing/reading wavelength of the current CD-R. To comply with this wavelength change, the organic dye compound used in the recording layer must be altered. One candidate is cyanine dyes, which undergo substantial light degradation and lack stability. Another candidate is azo compounds as described in JP-A 8-108623, JP-A 8-99467, etc., which are less resistant to light. Then, as dyes having high light resistance, JP-B 7-51682, JP-A 3-268994, and JP-A 8-156408 disclose metal azo complexes. Despite light resistance, these dyes have a low recording sensitivity and low solubility and suffer from the problem that when used in optical recording media, disc characteristics, especially reflectance (Rtop) and modulation remain unbalanced due to an increased half-value width of their absorption spectrum.

It is noted that JP-A 10-97732 describes an optical recording medium comprising a recording layer containing a specific xanthene dye such as Rhodamine B, and discloses an example in which the xanthene dye is used together with an azo metal complex. As to the combination of groups attached to opposite ends of the diazo group in the azo compounds which become the ligand of the azo metal complexes disclosed therein, a benzene or naphthalene ring combined with a pyrazole ring, and a benzene or naphthalene ring combined with an arylcarbamoyl-substituted alkene are allegedly preferable. In the Examples disclosed therein, the compounds used as the ligand are those compounds wherein, when represented by formula (I) as used herein, $R_8$ is a sulfamoyl group, and $R_3$ and $R_4$ form a benzene ring, but the amino moiety is eliminated. Also disclosed is an optical recording medium using in a recording layer a dye formed from such an azo cobalt complex anion and a xanthene dye cation. However, even these examples of using the xanthene dye in combination with the azo metal complex have the drawback that recording fails due to sensitivity shortage or even when recording is possible, the reflectance and modulation at the reading wavelength are generally reduced because the azo metal complex has a short absorption wavelength.

Further, the inventors previously proposed azo metal complexes in WO 98/29257. They are the compounds wherein, when represented by formula (I) as used herein, both $R_1$ and $R_2$ are alkyl groups, and preferably $R_7$ or $R_8$ is a nitro group. Regrettably, these azo metal complexes were also found to have the drawback that high-speed recording is impossible because of somewhat low sensitivity although normal recording is possible.

Additionally, JP-A 2-55189 discloses an optical recording medium having a recording layer formed from a diol six-coordinate metal complex salt compound between a cyanine dye and a naphthalenino-azobenzene. Furthermore, JP-A 3-51182 discloses an optical recording medium having a recording layer containing a photo-stabilized organic dye in the form of a combination of an anion of an azo metal complex salt compound with a cation of a cyanine dye having absorption in the wavelength region of recording light. These optical recording media, however, conform to a wavelength of about 780 nm, but not shorter wavelength recording.

SUMMARY OF THE INVENTION

An object of the invention is to provide an optical recording medium having advantages including a dye's sufficient solubility in a coating solvent which does not attack polycarbonate substrates and improved write/read characteristics, such as satisfactory jitter, with light having a wavelength of up to 690 nm.

This and other objects are attained by the invention defined below as (1) to (7).

(1) An optical recording medium capable of writing and reading operation with light having a wavelength of up to 690 nm, comprising a recording layer containing at least one chelate compound of a metal with a dye of the following formula (I):

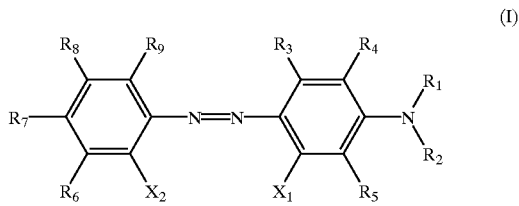

wherein each of $X_1$ and $X_2$ is independently a group having active hydrogen; each of $R_1$ and $R_2$ is independently selected from the group consisting of hydrogen, alkyl, aralkyl, aryl, and alkenyl groups, and $R_1$ and $R_2$, taken together, may form a ring; each of $R_3$, $R_4$, and $R_5$, is independently a monovalent group selected from the group consisting of hydrogen, alkyl, halogen, hydroxyl, carboxyl, carboxylic ester, sulfone, sulfonic ester, sulfamoyl, sulfonamide, carbamoyl, amide, amino, aryl, acyl, alkoxy, and alkenyl groups, and $R_3$ and $R_4$, taken together, may form a ring, or each pair of ($R_1$ and $R_4$) and ($R_2$ and $R_5$), taken together, may form a ring; each of $R_6$, $R_7$, $R_8$, and $R_9$ is independently a monovalent group selected from the group consisting of hydrogen, halogen, hydroxyl, carboxyl, sulfone, aryl, acyl, sulfonamide, amide, cyano, nitro, mercapto, thiocyano, amino, alkylthio, alkylazomethine, carboxylic ester, carbamoyl, sulfonic ester, sulfamoyl, alkyl, alkoxy, aralkyl, and alkenyl groups, and each pair of ($R_6$ and $R_7$), ($R_7$ and $R_8$), and ($R_8$ and $R_9$), taken together, may form a ring;

with the proviso that in any one of the cases where (i) all $R_3$ to $R_9$ are hydrogen, (ii) $R_7$ is a nitro group, (iii) $R_3$ and $R_4$ form a benzene ring, and all $R_5$ to $R_9$ are hydrogen, (iv) all $R_3$ to $R_7$ are hydrogen, and R8 and $R_9$ form a benzene ring, (v) $R_7$ is a halogen atom, and $R_3$ to $R_6$, $R_8$ and $R_9$ are monovalent groups as listed above, and (vi) $R_8$ is a nitro group, sulfamoyl group or halogen atom, and $R_3$ to $R_7$ and $R_9$ are monovalent groups as listed above; $R_1$ and $R_2$ are independently hydrogen, aralkyl, aryl or alkenyl groups or one of $R_1$ and $R_2$ is an alkyl group and the other is hydrogen, aralkyl, aryl or alkenyl group, and $R_1$ and $R_2$, taken together, may form a ring.

(2) The optical recording medium of (1) wherein the dye of the formula (I) is represented by the following formula (Ia):

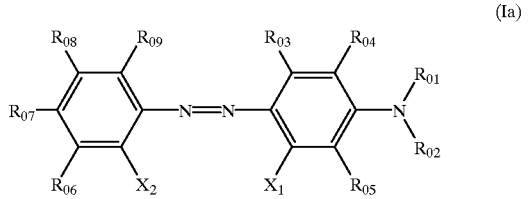

wherein each of $X_1$ and $X_2$ is independently a group having active hydrogen; each of $R_{01}$ and $R_{02}$ is independently hydrogen, alkyl or aryl group, and one of $R_{01}$ and $R_{02}$ is hydrogen or alkyl and the other is aryl, and $R_{01}$ and $R_{02}$, taken together, may form a ring; each of $R_{03}$, $R_{04}$, and $R_{05}$ is independently a monovalent group selected from the group consisting of hydrogen, alkyl, halogen, hydroxyl, carboxyl, carboxylic ester, sulfone, sulfonic ester, sulfamoyl, sulfonamide, carbamoyl, amide, amino, aryl, acyl, alkoxy, and alkenyl groups, and each pair of ($R_{01}$ and $R_{04}$) and ($R_{02}$ and $R_{05}$), taken together, may form a ring; $R_{06}$, $R_{07}$, $R_{08}$, and $R_{09}$ are independently monovalent groups selected from the group consisting of hydrogen, halogen, hydroxyl, carboxyl, sulfone, aryl, acyl, sulfonamide, amide, cyano, nitro, mercapto, thiocyano, amino, alkylthio, alkylazomethine, carboxylic ester, carbamoyl, sulfonic ester, sulfamoyl, alkyl, alkoxy, aralkyl, and alkenyl groups, at least one of $R_{07}$ and $R_{08}$ is a nitro or cyano group, and each pair of ($R_{06}$ and $R_{07}$) and ($R_{08}$ and $R_{09}$), taken together, may form a ring.

(3) The optical recording medium of (1) or (2) wherein the recording layer further contains a dye having a maximum absorption wavelength in the range of 500 nm to 630 nm in a thin film state.

(4) The optical recording medium of (3) wherein the recording layer contains a trimethinecyanine dye of the following formula (II):

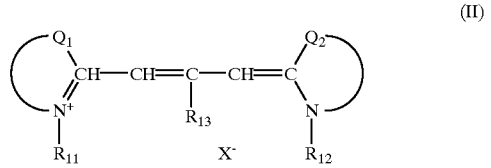

wherein each of $Q_1$ and $Q_2$ is a group of atoms necessary to form a heterocycle with the carbon and nitrogen atoms, the heterocyclic skeletons completed by $Q_1$ and $Q_2$ may be the same or different; $R_{11}$ and $R_{12}$ are each aliphatic hydrocarbon groups and may be the same or different; $R_{13}$ is hydrogen or a monovalent substituent; and X is a monovalent anion.

(5) The optical recording medium of any one of (1) to (4) wherein the recording layer contains a salt-forming dye between a complex ion of the chelate compound of a metal with a dye of the formula (I) and an ion of a dye having a maximum absorption wavelength in the range of 500 nm to 630 nm in a thin film state.

(6) The optical recording medium of (5) wherein the recording layer contains a salt-forming dye between a complex ion of the chelate compound of a metal with a dye of the formula (I) and an ion of a trimethinecyanine dye of the formula (II).

(7) The optical recording medium of any one of (4) to (6) wherein the trimethinecyanine dye of the formula (II) is an indolenine cyanine dye.

DESCRIPTION OF THE PREFERRED EMBODIMENTS

Figure 1:
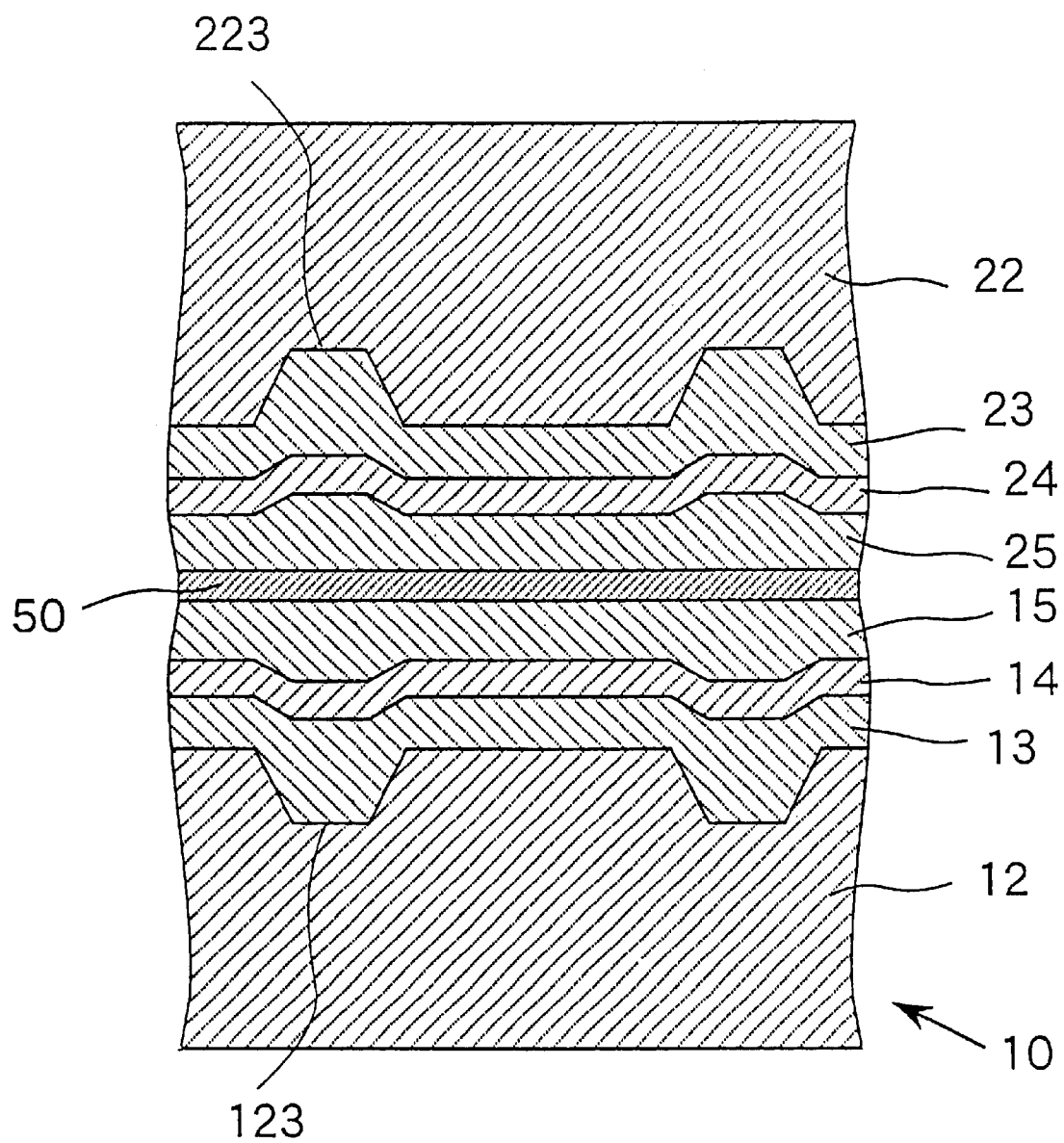
FIG. 1 is a fragmentary cross-sectional view of one exemplary optical recording disc according to the invention.

Now the invention is described in detail.

The optical recording medium of the invention uses writing and reading light having a wavelength of up to 690 nm, has a recording layer and preferably a reflective layer thereon, and performs in the heat mode wherein recording is carried out by irradiating light to the recording layer to form small holes, known as pits. The recording layer contains a chelate compound of an azo dye of the formula (I) with a metal (i.e., an azo metal complex dye).

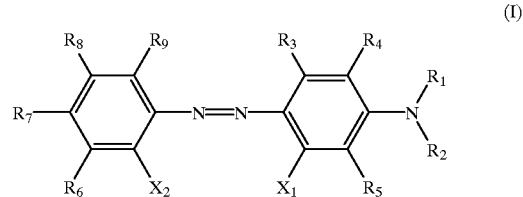

Referring to formula (I), each of $X_1$ and $X_2$ independently represents a group having active hydrogen; each of $R_1$ and $R_2$ independently represents a hydrogen atom, alkyl group, aralkyl group, aryl group or alkenyl group, and $R_1$ and $R_2$, taken together, may form a ring. Each of $R_3$, $R_4$, and $R_5$ independently represents a monovalent group selected from the group consisting of a hydrogen atom, alkyl group, halogen atom, hydroxyl group, carboxyl group, carboxylic ester group, sulfone group, sulfonic ester group, sulfamoyl group, sulfonamide group, carbamoyl group, amide group, amino group, aryl group, acyl group, alkoxy group, aralkyl group, and alkenyl group. $R_3$ and $R_4$, taken together, may form a ring. Each pair of ($R_1$ and $R_4$) and ($R_2$ and $R_5$), taken together, may form a ring. Each of $R_6$, $R_7$, $R_8$, and $R_9$ independently represents a monovalent group selected from the group consisting of a hydrogen atom, halogen atom, hydroxyl group, carboxyl group, sulfone group, aryl group, acyl group, sulfonamide group, amide group, cyano group, nitro group, mercapto group, thiocyano group, amino group, alkylthio group, alkylazomethine group, carboxylic ester group, carbamoyl group, sulfonic ester group, sulfamoyl group, alkyl group, alkoxy group, aralkyl group, and alkenyl group. Each pair of ($R_6$ and $R_7$), ($R_7$ and $R_8$), and ($R_8$ and $R_9$), taken together, may form a ring.

It is provided that in any one of the cases where (i) all $R_3$ to $R_9$ are hydrogen, (ii) $R_7$ is a nitro group, (iii) $R_3$ and $R_4$ form a benzene ring, and all $R_5$ to $R_9$ are hydrogen, (iv) all $R_3$ to $R_7$ are hydrogen, and $R_8$ and $R_9$ form a benzene ring, (v) $R_7$ is a halogen atom, and $R_3$ to $R_6$, $R_8$ and $R_9$ are monovalent groups as listed above (exclusive of groups forming a ring), and (vi) $R_8$ is a nitro group, sulfamoyl group or halogen atom, and $R_3$ to $R_7$ and $R_9$ are monovalent groups as listed above (exclusive of groups forming a ring); each of $R_1$ and $R_2$ independently represents a hydrogen atom, aralkyl group, aryl group or alkenyl group, or one of $R_1$ and $R_2$ is an alkyl group and the other is a hydrogen atom, aralkyl group, aryl group or alkenyl group, and $R_1$ and $R_2$, taken together, form a ring. It is excluded that both $R_1$ and $R_2$ are alkyl groups. In the cases of (ii), (v), and (vi), each pair of ($R_1$ and $R_4$) and ($R_2$ and $R_5$), taken together, may form a ring. In the case of (iii), $R_1$ and $R_4$, taken together, may form a ring.

The active hydrogen-containing groups represented by $X_1$ and $X_2$ include —OH, —SH, —$NH_2$, —COOH, —$CONH_2$, —$SO_2NH_2$, and —$SO_3H$, with —OH being especially preferred.

The halogen atoms mentioned above include fluorine, chlorine and bromine atoms.

The alkyl groups are preferably those having 1 to 12 carbon atoms in total, may be straight or branched, and in some cases, may be cycloalkyl groups or have cycloalkyl groups. The alkyl groups may further have substituents, examples of which include halogen atoms and alkoxy groups.

The aryl groups may further have substituents and include phenyl and tolyl groups, for example. The aryl groups preferably have 6 to 10 carbon atoms in total.

The acyl groups include acetyl, propionyl, and butyryl groups. The acyl groups preferably have 2 to 5 carbon atoms in total.

The aralkyl groups include benzyl, hydroxybenzyl, and methylbenzyl groups. The aralkyl groups preferably have 7 to 10 carbon atoms in total.

The amino groups are preferably substituted ones, with dialkylamino groups being especially preferred. The alkyl moiety of the dialkylamino group preferably has 1 to 12 carbon atoms and may be straight or branched.

The alkenyl groups are preferably those having 2 to 10 carbon atoms in total, may be straight or branched, and may have substituents. Exemplary are vinyl, allyl, propenyl, butenyl, and pentenyl groups.

The carboxylic ester groups are preferably those having 2 to 10 carbon atoms in total. Exemplary are methoxycarbonyl, ethoxycarbonyl, propoxycarbonyl, and acetoxycarbonyl groups.

The sulfone groups are preferably those having 1 to 10 carbon atoms in total. Exemplary are methylsulfonyl, benzenesulfonyl, ethylsulfonyl, and n-propylsulfonyl groups.

The sulfonic ester groups are preferably those having 1 to 10 carbon atoms in total. Exemplary are methoxysulfonyl, ethoxysulfonyl, propoxysulfonyl, and butoxysulfonyl groups.

The sulfamoyl groups may have substituents and are preferably those having 0 to 10 carbon atoms in total. Exemplary are sulfamoyl, methylsulfamoyl, ethylsulfamoyl, n-propylsulfamoyl, and isopropylsulfamoyl groups.

The sulfonamide groups are preferably those having 1 to 10 carbon atoms in total. Exemplary are methylsulfonamide, ethylsulfonamide, and n-propylsulfonamide groups.

The carbamoyl groups may have substituents and are preferably those having 1 to 10 carbon atoms in total. Exemplary are carbamoyl, methylcarbamoyl, ethylcarbamoyl, n-propylcarbamoyl, and isopropylcarbamoyl groups.

The amide groups are preferably those having 2 to 10 carbon atoms in total. Exemplary are acetamide, propionylamide, butyrylamide, and benzamide groups.

The alkoxy groups are preferably those having 1 to 4 carbon atoms in total. Exemplary are methoxy, ethoxy, propoxy, and pentafluoropropoxy groups.

The alkylthio groups are preferably those having 1 to 4 carbon atoms in total. Exemplary are methylthio, ethylthio, n-propylthio and isopropylthio groups.

The alkylazomethine groups are preferably those having 2 to 5 carbon atoms in total. Exemplary are methylazomethine, ethylazomethine, and n-propylazomethine groups.

The hydroxyl and carboxyl groups may form salts.

The ring formed by each pair of ($R_1$ and $R_2$), ($R_1$ and $R_4$), and ($R_2$ and $R_5$) is preferably a 5- or 6-membered aliphatic ring or aromatic ring, with the 6-membered ring being especially preferred.

The ring formed by each pair of ($R_3$ and $R_4$), ($R_6$ and $R_7$), ($R_7$ and $R_8$), and ($R_8$ and $R_9$) is preferably a 6-membered aromatic ring, with a benzene ring being especially preferred.

Under the above-mentioned restrictions (i) to (vi), it is preferred that at least one of $R_7$ and $R_8$ is a nitro or cyano group. As to the combination of $R_1$ and $R_2$, in particular, it is preferred that one of $R_1$ and $R_2$ is a hydrogen atom or alkyl group, especially hydrogen, and the other is an aryl group, or $R_1$ and $R_2$ form a ring, or one or both, especially both, of the pairs of ($R_1$ and $R_4$) and ($R_2$ and $R_5$) form a ring.

$R_3$ and $R_4$ are preferably monovalent groups. It is preferred that $R_3$ and $R_4$ do not form a ring. Most preferably, $R_3$ and $R_4$ are hydrogen.

$R_5$ to $R_9$ are preferably hydrogen atoms, except for the case where $R_7$ and $R_8$ represent preferable substituents as mentioned above. It is also preferred that $R_7$ and $R_6$, taken together, form a benzene ring.

Specifically, preferred among the dyes of formula (I) are those dyes represented by the following formula (Ia).

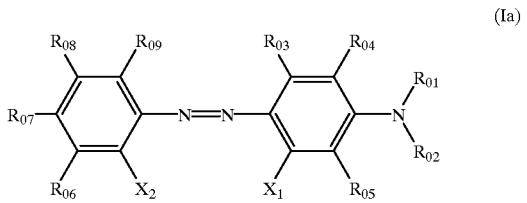

(Ia)

In formula (Ia), each of $R_{01}$ and $R_{02}$ independently represents a hydrogen atom, alkyl group or aryl group. One of $R_{01}$ and $R_{02}$ is a hydrogen atom or alkyl group and the other is an aryl group. Also, $R_{01}$ and $R_{02}$, taken together, may form a ring.

$X_1$ and $X_2$ are as defined in formula (I). $R_{03}$ to $R_{07}$ are the same as $R_3$ to $R_9$ in formula (I). It is noted that at least one of $R_{07}$ and $R_{08}$ is a nitro or cyano group, and $R_{03}$ and $R_{04}$ are of the same definition as the monovalent groups represented by $R_3$ and $R_4$ in formula (I). Each pair of ($R_{01}$ and $R_{04}$) and ($R_{02}$ and $R_{05}$), taken together, may form a ring.

Each pair of ($R_{06}$ and $R_{07}$) and ($R_{08}$ and $R_{09}$), taken together, may form a ring.

Further preferred embodiments of formula (Ia) are the same as in formula (I).

The metal which forms a metal chelate compound with the azo compound defined above is not critical as long as it has an ability to form a chelate compound with the azo compound of formula (I), although transition elements such as Ni, Co, Cr, and Cu and vanadyl are desirable.

The metal complex formed in this way can possess a negative charge as a whole, depending on a center metal. In such a case, the center metal may be an alkali metal ion such as Na⁺. However, the formation of salts with dyes having a positive charge such as Rhodamine dyes, triphenylmethane dyes, and trimethinecyanine dyes of formula (II) is especially preferred in view of the electrical characteristics and light resistance of discs. It is especially preferred to form salts with trimethinecyanine dyes of formula (II) among others. It is noted that formula (II) is described later.

Illustrative examples of the chelate compounds used herein are given below although the invention is not limited thereto. It is noted that those chelate compounds having a cyanine cation as the counter ion are shown by the expression to be described later.

-continued

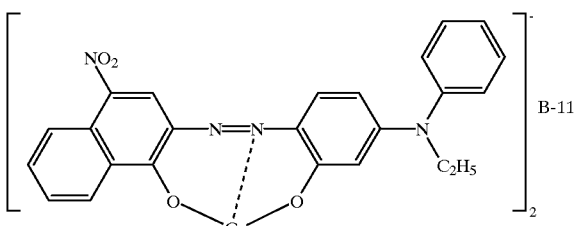
I-5

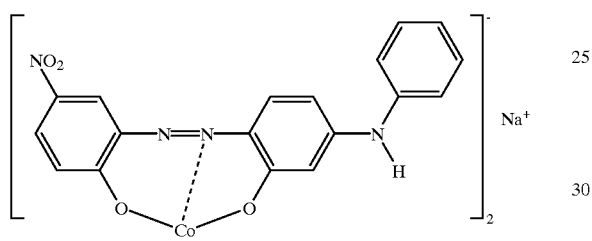
I-1

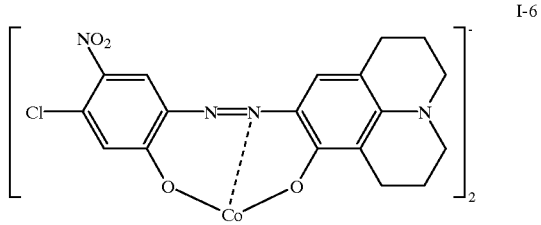
I-6

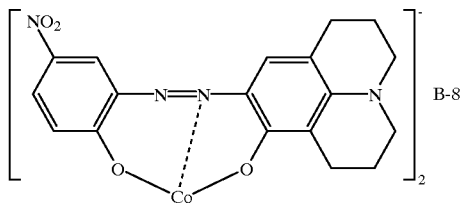
I-2

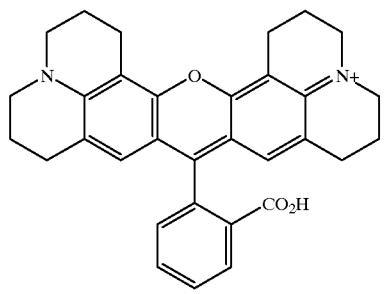

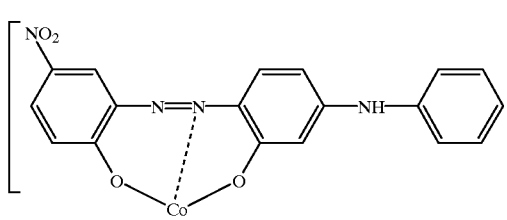
I-3

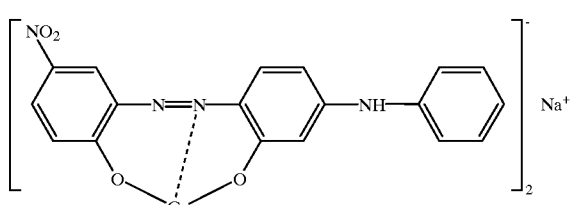
I-7

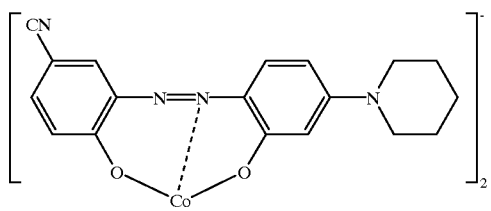
I-4

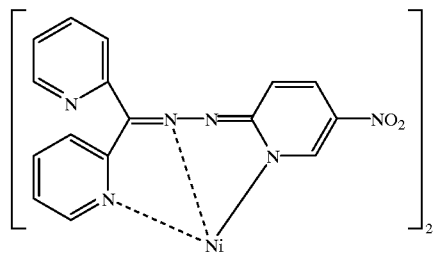

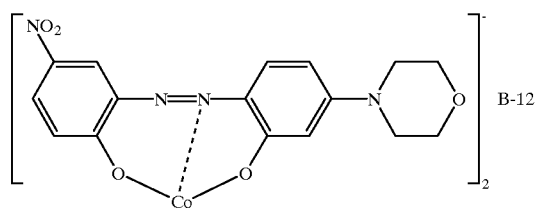

I-8

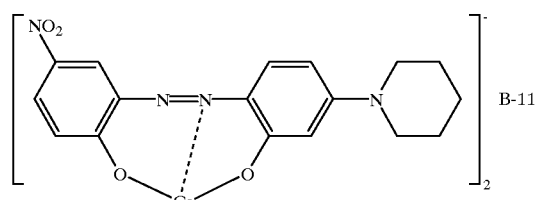

I-9

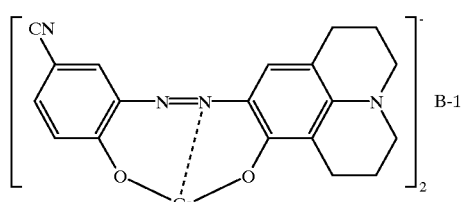

I-10

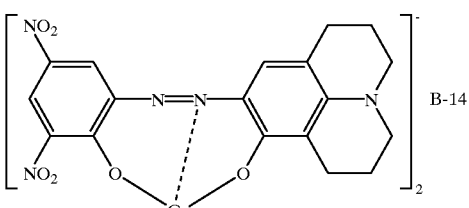

I-11

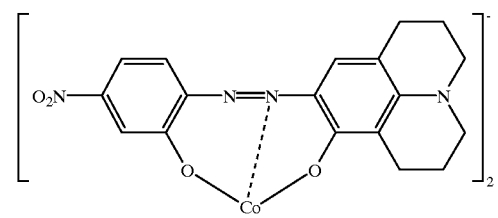

I-12

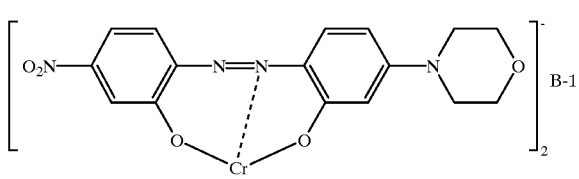

I-13

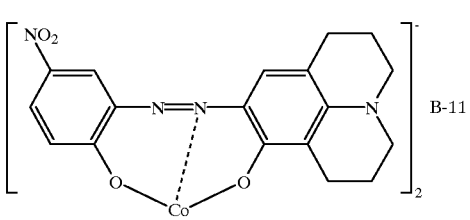

I-14

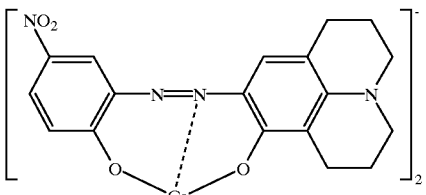

I-15

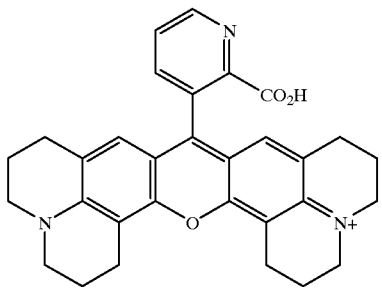

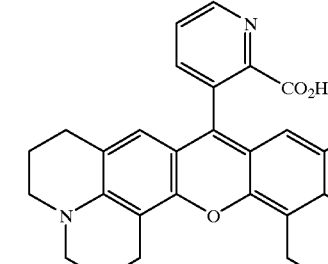

I-16

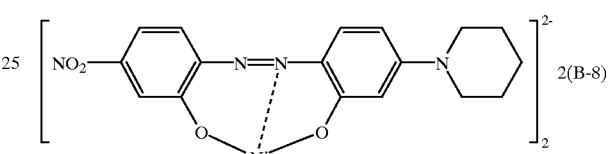

I-17

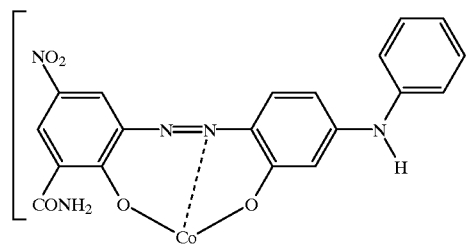

I-18

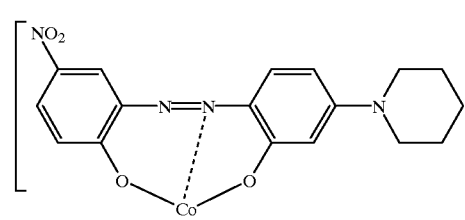

Of these compounds, azo metal complexes can be synthesized according to Furukawa, Anal. Chim. Acta., 140, 289 (1982). Azo metal complexes having cations of Rhodamine dyes, triphenylmethane dyes, trimethinecyanine dyes, etc. can be obtained by synthesizing azo metal complexes in the form of Na$^+$ salts and then exchanging the cation with the desired dye by a well-known method.

The compounds of the invention have a melting point (mp) of 220 to 360° C. and a maximum absorption wavelength λmax (as measured on a dye thin film of 50 nm thick) in the range of 500 to 630 nm.

The compounds have a complex index of refraction whose real part n is from 2.0 to 2.80 and imaginary part k is from 0 to 0.40 in the wavelength region of 635 nm to 670 nm.

It is noted that n and k of a dye are determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance in the wavelength region of 635 nm to 670 nm, and calculating n and k from these measurements according to ISHIGURO Kozo, "Optics," Kyoritsu Publishing K.K., pp. 168–178, for example. The reflectance is a reflectance of the test sample through the substrate or a reflectance of the sample from the dye film side while it is measured in a specular reflection mode (of the order of 5° C.).

As the dye for the recording layer, the chelate compounds of the invention may be used alone or in admixture of two or more. The chelate compounds also have a quencher function.

These dyes have a high light fastness, a sufficient solubility in organic solvents, and an increased solubility in coating solvents which do not attack polycarbonate (PC) resins commonly used as the substrate material in organic recording media.

The recording layer using these dyes is preferable for use especially in write-once optical recording discs (DVD-R). The recording layer can be formed using a coating solution containing the dye. In particular, a spin coating method involving applying and spreading a coating solution on a rotating substrate is preferable. The recording layer may otherwise be formed by a gravure coating, spray coating or dipping method.

After spin coating as above, the coating is dried if necessary. The thus formed recording layer generally has a thickness of 500 to 4,000 Å(50 to 400 nm) although the thickness is determined as appropriate in accordance with the desired reflectance, etc.

It is recommended that the coating solution generally contains the dye in a concentration of 0.05 to 10% by weight. Since the chelate compound of the invention is well soluble, a coating solution having such a dye concentration can be readily prepared. More particularly, the azo dyes of the invention exhibit a good solubility mainly in polar solvents and are soluble in, for example, alcohols, cellosolve or alkoxyalcohols, keto-alcohols such as diacetone alcohols, ketones such as cyclohexanone, and fluorinated alcohols such as 2,2,3,3-tetrafluoropropanol in a concentration of 0.5 to 10% by weight. The dyes are soluble in a concentration of at least 1% by weight in ethyl cellosolve or 2,2,3,3-tetrafluoropropanol which is the desirable coating solvent especially when applied to polycarbonate disc substrates, enabling a film of quality to be briefly formed by spin coating.

In the coating solution, a binder, dispersant, stabilizer and other additives may be contained if desired.

In addition to the dye of the invention, a light absorbing dye of another type may be contained in the recording layer of the optical recording medium according to the invention. Especially preferred are dyes having a maximum absorption wavelength in the range of 500 nm to 630 nm in a thin film state (i.e., a film of 100 to 200 nm thick). Examples of these dyes include cyanine dyes, metal complex dyes of different types from the above-mentioned, for example, hydrazine metal complexes, styryl dyes, porphyrin dyes, Rhodamine dyes, triphenylmethane dyes, and formazan metal complexes. In this embodiment, the additional dye may be added to the coating solution before a recording layer is formed from the coating solution.

Trimethinecyanine dyes of the following formula (II) are especially preferred.

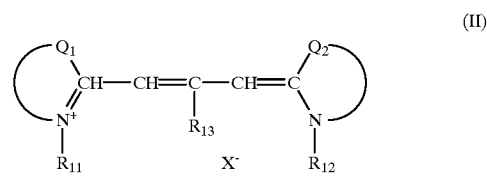

Referring to formula (II), $Q_1$ and $Q_2$ may be the same or different and each are a group of atoms necessary to form a 5-membered nitrogenous heterocycle which may have a fused ring. Exemplary heterocyclic rings include indolenine, 4,5-benzoindolenine, oxazoline, thiazoline, selenazoline, and imidazoline rings.

Of these, indolenine rings are especially preferred. These rings may have substituents, examples of which include halogen atoms, alkyl groups, alkoxy groups, aryl groups, acyl groups, amino groups, and nitro groups.

Each of $R_{11}$ and $R_{12}$ represents an aliphatic hydrocarbon group, preferably alkyl group. The alkyl group may have a substituent(s) and is desirably of 1 to 5 carbon atoms. Exemplary substituents are halogen atoms, alkyl groups, and ether groups.

$R_{13}$ is hydrogen or a monovalent substituent such as a halogen atom or alkyl group.

$X^-$ preferably represents complex ions of the chelate compounds of the invention as described above, for example, halide ions (e.g., $Cl^-$, $Br^-$ and $I^-$), $ClO_4^-$, and $BF_4^-$.

Illustrative examples of the trimethinecyanine dyes of formula (II) used herein are given below. They are shown as cations, with $X^-$ being omitted.

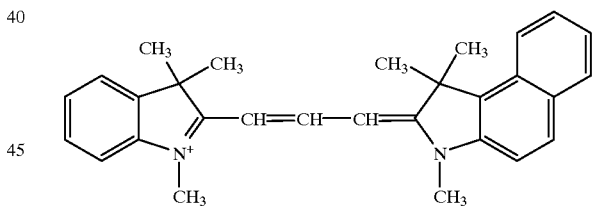

B-1

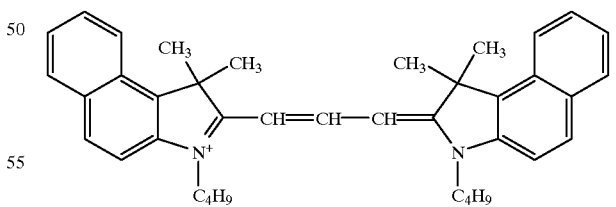

B-2

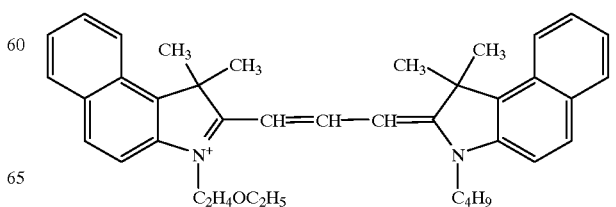

B-3

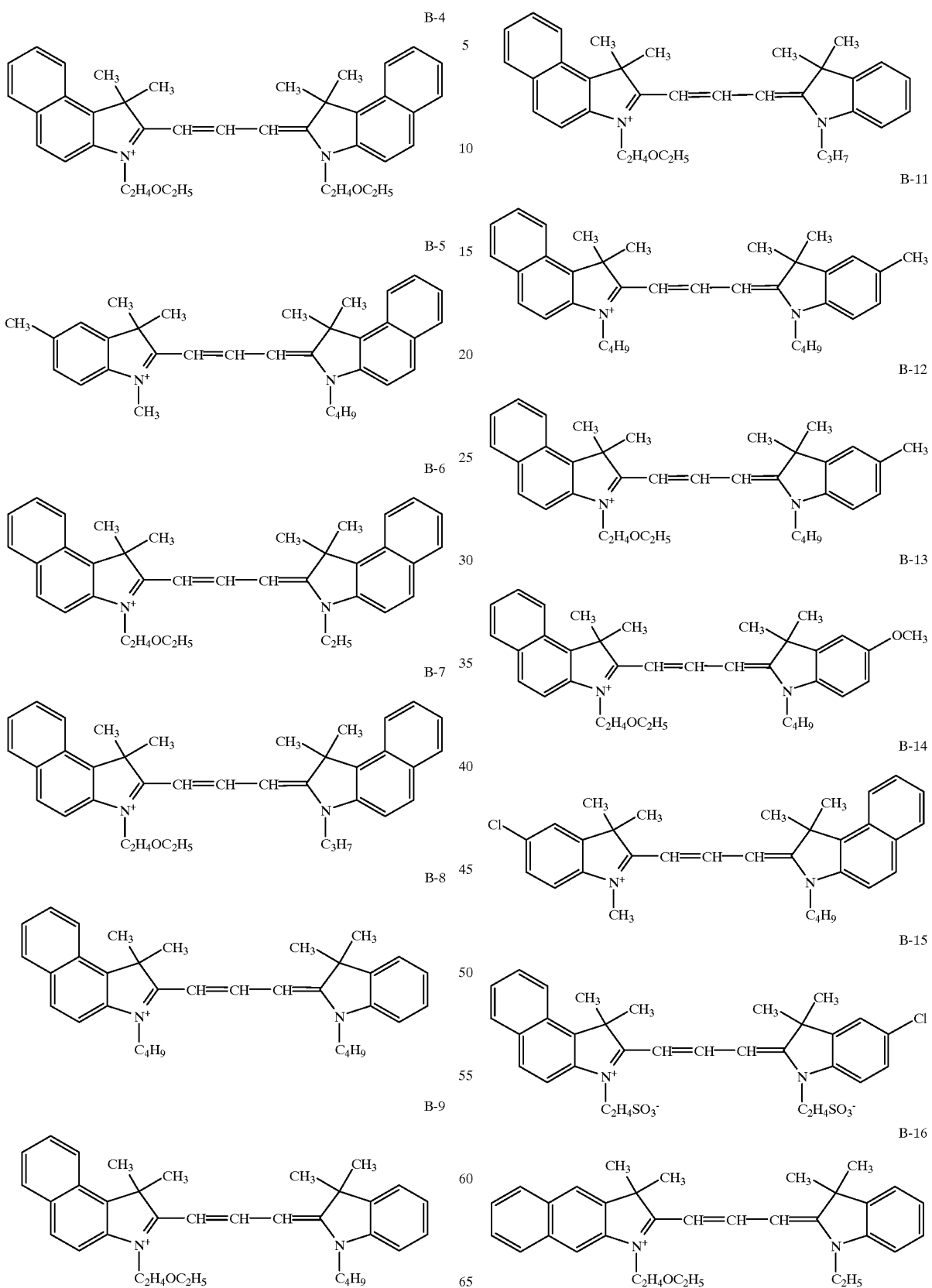

B-17
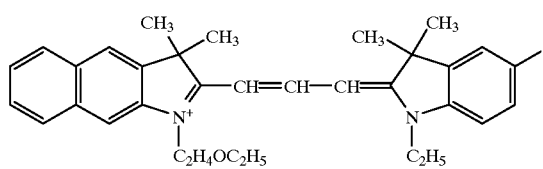
B-18
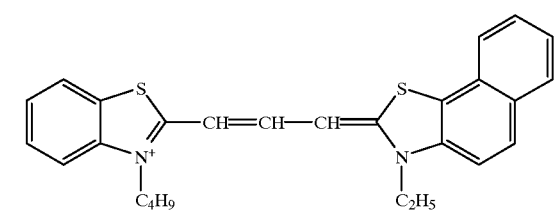
B-19
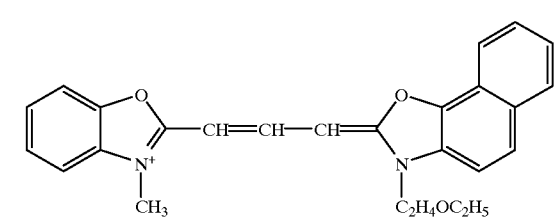
B-20
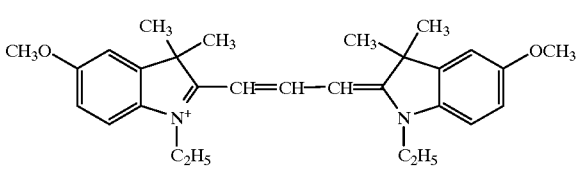
B-21
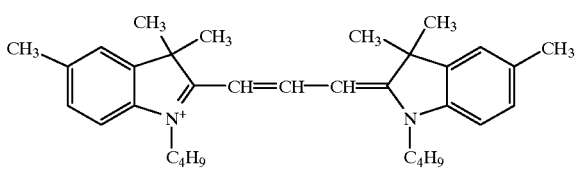
B-22
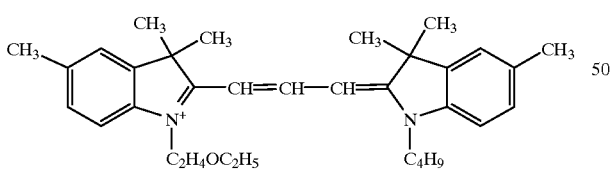
B-23
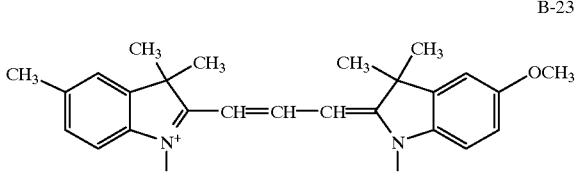
B-24
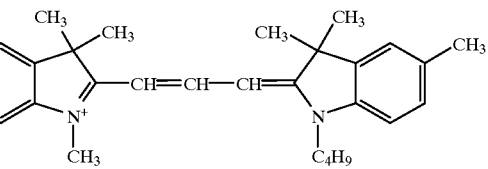
B-25
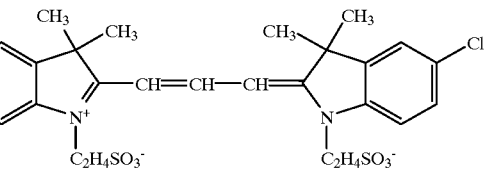
B-26
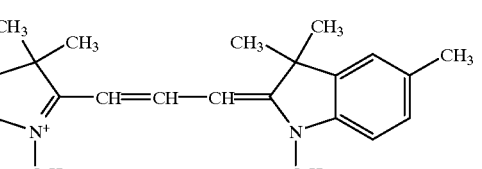
B-27
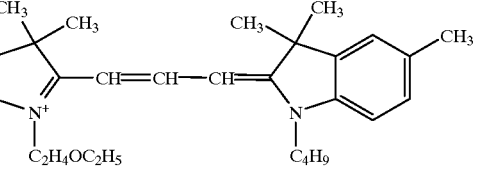
B-28
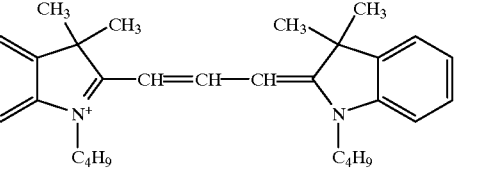
B-29
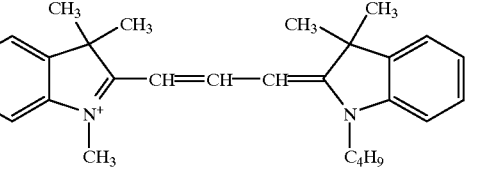
B-30
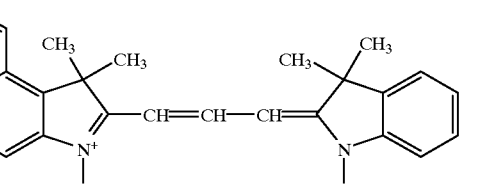

B-31
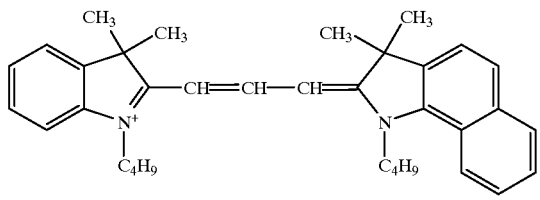

B-32
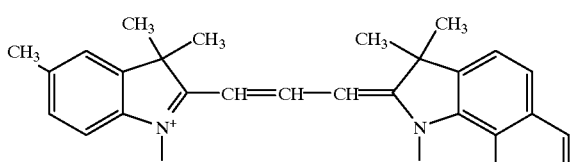

B-33
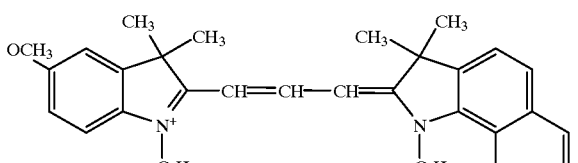

B-34
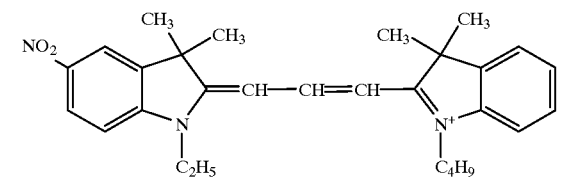

B-35
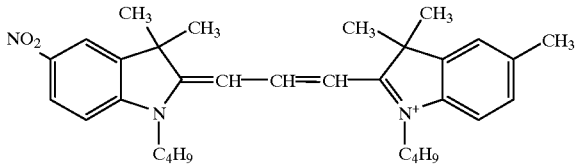

B-36
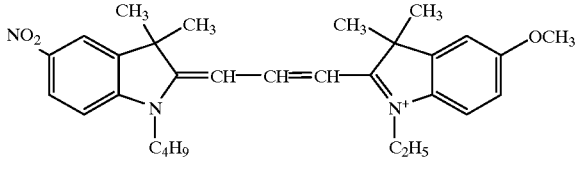

B-37
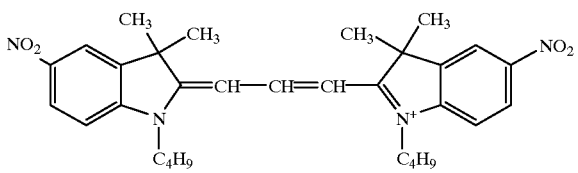

B-38
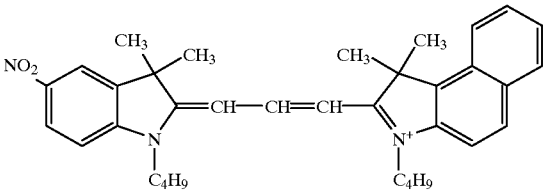

It is preferred to use in combination the chelate compound of the invention and the trimethinecyanine dye, especially trimethine indolenine cyanine dye of formula (II). Most preferably they are used in the form of a salt-forming dye as previously described, although it is also preferable that they are used in admixture as respective salts having different counter ions. It is further possible to use the salt-forming dye in combination with another salt having a counter ion.

In mixing the chelate compound of the invention with the trimethinecyanine dye of formula (II), the molar ratio of the chelate compound of the invention to the dye of formula (II) preferably ranges from 5:1 to 1:3, whether or not they form a salt.

The coating solvent used herein is properly selected, for example, from alcohol solvents (including keto alcohols and alkoxyalcohols such as ethylene glycol monoalkyl ethers), aliphatic hydrocarbon solvents, ketone solvents, ester solvents, ether solvents, aromatic solvents, and halogenated alkyl solvents.

Of these, the alcohol and aliphatic hydrocarbon solvents are preferred. Of the alcohol solvents, alkoxyalcohols and keto alcohols are preferred. More preferred are alkoxyalcohols whose alkoxy moiety has 1 to 4 carbon atoms and whose alcohol moiety has 1 to 5 carbon atoms, especially 2 to 5 carbon atoms, with alkoxyalcohols having 3 to 7 carbon atoms in total being especially preferred. Illustrative examples include ethylene glycol monoalkyl ethers (or cellosolves) such as ethylene glycol monomethyl ether (methyl cellosolve), ethylene glycol monoethyl ether (also designated ethyl cellosolve or ethoxyethanol), butyl cellosolve, and 2-isopropoxy-1-ethanol; 1-methoxy-2-propanol, 1-methoxy-2-butanol, 3-methoxy-1-butanol, 4-methoxy-1-butanol, and 1-ethoxy-2-propanol. Exemplary of the keto alcohol is diacetone alcohol. Fluorinated alcohols such as 2,2,3,3-tetrafluoropropanol are also useful.

Preferred examples of the aliphatic hydrocarbon include n-hexane, cyclohexane, methylcyclohexane, ethylcyclohexane, cyclooctane, dimethylcyclohexane, n-octane, isopropylcyclohexane, and t-butylcyclohexane, with the ethylcyclohexane and dimethylcyclohexane being especially preferred.

Exemplary of the ketone solvent is cyclohexanone.

In the practice of the invention, alkoxyalcohols such as ethylene glycol monoalkyl ethers are preferred, and inter alia, ethylene glycol monoethyl ether, 1-methoxy-2-propanol and 1-methoxy-2-butanol are preferred. Mixtures of these solvents are also useful, an example of which is a mixture of ethylene glycol monoethyl ether and 1-methoxy-2-butanol. Fluorinated alcohols are also preferably used.

Referring to FIG. 1, there is illustrated one exemplary construction of a write-once digital video disc (DVD-R)

capable of writing and reading operation at a short wavelength of about 630 to 670 nm, which is one preferred embodiment of the optical recording medium of the invention. FIG. 1 is a cross-sectional view of a portion of the disc.

An optical recording disc 10 as shown in FIG. 1 is designed to conform to the DVD standard and constructed by adhesively joining a pair of discs of the same structure at their protective films 15 and 25. An adhesive layer 50 is about 10 to 200 μm thick. Each of the substrates (commonly made of polycarbonate resin) has a thickness of 0.6 mm. On a substrate 12 having a groove 123, a recording layer 13, a reflective layer 14, and a protective film 15 are sequentially formed. Similarly, a recording layer 23, a reflective layer 24, and a protective film 25 are formed on a substrate 22 having a groove 223. The substrates are adhesively joined as above. The adhesive joint may be made using a hot-melt adhesive, delay action UV adhesive, adhesive sheet, etc.

The substrate 12 or 22 is disc shaped. To enable write and read from the back surface, the substrate 12 or 22 is preferably formed of a resin or glass material which is substantially transparent to writing and reading light (typically laser light having a wavelength of about 600 nm to about 690 nm, preferably about 630 nm to about 680 nm, more preferably about 635 nm to about 680 nm, and especially 635 nm to 670 nm) or in another parlance, has a transmittance of at least 88%. With respect to dimensions, the disc has a diameter of about 64 mm to about 200 mm and a thickness of about 0.6 mm.

On the surface of the substrate 12 or 22 where the recording layer 13 or 23 is formed, a groove 123 or 223 is formed for tracking purposes, as shown in FIG. 1. The groove 123 or 223 is preferably a continuous spiral groove having a depth of 0.05 to 0.20 μm (500 to 2,000 Å), a width of 0.20 to 0.40 μm and a groove pitch of 0.65 to 0.85 μm. Such groove configuration enables good-enough tracking signals to be obtained without a lowering of the reflection level of the groove area. It is particularly important to limit the groove width to 0.20 to 0.40 μm. A groove width of less than 0.2 μm makes it difficult to obtain tracking signals of sufficient magnitude, resulting in an increased jitter even when tracking is slightly offset during recording. A too greater groove width has a likelihood of waveform distortion.

The substrate 12 or 22 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 123 or 223 should be formed simultaneously with the molding of the substrate 12 or 22. Alternatively, a resin layer having the groove 123 or 223 may be formed by 2P or other methods after the fabrication of the substrate 12 or 22. Also, glass substrates are useful as the case may be.

As shown in FIG. 1, the recording layer 13 or 23 on the substrate 12 or 22 is formed by using a dye-containing coating solution and applying, preferably spin coating the solution, as described above. The spin coating may be carried out from the inner to the outer periphery under conventional conditions while adjusting the number of revolutions in the range of 500 to 5,000 rpm.

The thus formed recording layer 13 or 23 has a thickness of 50 to 400 nm (500 to 4,000 Å) and a complex index of refraction whose real part n is from 2.0 to 2.8 and imaginary part k is up to 0.4 in the wavelength region of recording and reading light.

A thickness outside the range leads to a lower reflectance and obstructs satisfactory reading.

Restricting n and k to the above range insures satisfactory writing and reading operation. With k in excess of 0.4, no sufficient reflectance is available. With n of less than 2.0, the modulation of signals is too low. The upper limit of n is not critical, but is generally set at about 2.8 for the convenience of synthesis of a dye compound.

It is noted that n and k of a dye are determined by preparing a test sample in which a dye film is formed on a given transparent substrate to a thickness of about 40 to 100 nm under actual conditions, measuring the test sample for reflectance through the substrate or from the recording layer side. The reflectance is measured in a specular reflection mode (of the order of 5°) using the wavelength (635–670 nm) of writing and reading light. the sample is also measured for transmittance. From these measurements, n and k are calculated according to ISHIGURO Kozo, "Optics," Kyoritsu Publishing K.K., pp. 168–178, for example.

As shown in FIG. 1, the reflective layer 14 or 24 is formed in direct close contact with the recording layer 13 or 23. For the reflective layer 14 or 24, a high reflectance metal or alloy such as Au, Cu, Al, Ag or AgCu may be used. The reflective layer 14 or 24 preferably has a thickness of at least 50 nm (500 Å) and may be formed by evaporation or sputtering. The upper limit of the thickness is not critical although a thickness of up to about 120 nm (1,200 Å) is preferred when the cost, production time and other factors are taken into account. Then the reflective layer 14 or 24 alone has a reflectance of at least 90%, which ensures a satisfactory reflectance of unrecorded areas of the medium through the substrate.

As shown in FIG. 1, the protective film 15 or 25 is formed on the reflective layer 14 or 24. The protective film 15 or 25 may be formed of various resin materials such as UV-curable resins and generally to a thickness of about 0.5 to about 100 μm. The protective film 15 or 25 may be a layer or a sheet. The protective film 15 or 25 may be formed by conventional methods such as spin coating, gravure coating, spray coating, and dipping.

In the recording or writing once of the optical recording disc 1 of the above construction, recording light of 635 nm or 650–670 nm, for example, is irradiated in pulses to the recording layer through the substrate 12 or 22 to change the light reflectance of the irradiated spots. It is noted that upon irradiation of recording light, the recording layer 13 or 23 absorbs the light to generate heat, with which the substrate 12 or 22 is simultaneously heated. As a result, the recording layer material, typically the dye can be melted or decomposed in proximity to the interface between the substrate 12 or 22 and the recording layer 13 or 23, applying a pressure to the interface between the substrate 12 or 22 and the recording layer 13 or 23 to deform the bottom and side wall of the groove.

EXAMPLE

Examples of the invention are given below together with Comparative Examples for further illustrating the invention.

Example 1

First described is the synthesis of a chelate compound within the scope of the invention.

Synthesis of Compound I-1

In 20 ml of methanol was dissolved 1.54 g (10 mmol) of 2-amino-4-nitrophenol. With stirring at 0 to 5° C., 0.69 g (10 mmol) of sodium nitrite in 15 ml of water was slowly added to the solution to effect azotation. This was slowly added to a solution of 1.85 g (10 mmol) of 3-hydroxydiphenylamine and 2.0 g (50 mmol) of sodium hydroxide in 20 g of water to effect coupling reaction. After the completion of reaction, the crystals were collected by suction filtration and dried in vacuum, obtaining a ligand.

To 10 ml of water were added 0.35 g (1.0 mmol) of the ligand, 0.071 g (0.55 mmol) of anhydrous cobalt (II) chloride, and 0.08 g (2.0 mmol) of sodium hydroxide. Stirring was continued for 16 hours at 90° C. After the completion of reaction, Dye Compound I-1 was taken out of the organic layer.

Identification was made by mass spectroscopy, $^1$H-NMR spectroscopy, and IR absorption spectroscopy. The yield was 70%.

Example 2

Dye Compound I-1 was used as the optical recording layer dye. On a polycarbonate resin substrate having a diameter of 120 mm, a thickness of 0.6 mm, and a pregroove (depth 0.12 μm, width 0.30 μm, and groove pitch 0.74 μm), a recording layer containing the dye was formed to a thickness of 1,000 Å(100 nm) by spin coating. The coating solution used herein was a solution of 1.0% by weight of the dye in 2,2,3,3-tetrafluoropropanol. Next, a reflective layer of Au was formed on the recording layer to a thickness of 850 Å(85 nm) by sputtering. Further a transparent protective film of UV-curable acrylic resin (5 μm thick) was formed. A disc as shown in FIG. 1 was fabricated by joining a pair of similarly prepared discs with an adhesive, with the protective films disposed inside.

This is designated Sample No. 1.

Samples (Table 1) were fabricated by the same procedure as Sample No. 1 except that the dyes or dye mixture shown in Table 1 were used as the recording layer dye instead of Dye Compound I-1.

It is noted that Sample No. 6 in Table 1 used a dye mixture of Dye Compound I-1 having the compound of formula (I) as the ligand and a cyanine dye of formula (II) (ClO$_4^-$ salt of B-11) in a mixing ratio of 70:30 as expressed by the molar ratio of the dye compound having the compound of formula (I) as the ligand to the cyanine dye.

The disc samples thus fabricated were evaluated for characteristics by recording signals at a linear velocity of 3.5 m/s or 7.0 m/s with a laser beam of 635 nm, and thereafter, reading the signals at a linear velocity of 3.5 m/s with a laser beam of 650 nm. The lens used had a numerical aperture (NA) of 0.60. The characteristics examined include a reflectance, modulation (14 TMod), and jitter at 650 nm, and an optimum recording power (Po) at 635 nm.

The results are shown in Tables 1 and 2.

TABLE 1

| | 3.5 m/s writing, 3.5 m/s reading (635 nm writing, 650 nm reading) | | | | |
|---|---|---|---|---|---|
| Sample No. | Dye | Rtop | Mod (%) | Jitter (%) | Po (mW) |
| 1 | I-1 | 45 | 63 | 8.0 | 9.0 |
| 2 | I-2 | 50 | 70 | 7.0 | 8.0 |
| 3 | I-3 | 50 | 65 | 7.6 | 8.5 |
| 4 | I-4 | 50 | 63 | 7.1 | 8.0 |
| 5 | I-5 | 48 | 64 | 7.4 | 8.7 |

TABLE 1-continued

| | 3.5 m/s writing, 3.5 m/s reading (635 nm writing, 650 nm reading) | | | | |
|---|---|---|---|---|---|
| Sample No. | Dye | Rtop | Mod (%) | Jitter (%) | Po (mW) |
| 6 | I-1 + B-11 (ClO$_4^-$ salt)[1] | 55 | 70 | 7.8 | 9.0 |
| 7 | I-6 | 45 | 60 | 8.8 | 9.5 |
| 8 | I-7 | 44 | 62 | 9.0 | 9.6 |

[1]I-1: B-11 = 70:30 (molar ratio)

TABLE 2

| | 7.0 m/s writing, 3.5 m/s reading (635 nm writing, 650 nm reading) | | | | |
|---|---|---|---|---|---|
| Sample No. | Dye | Rtop | Mod (%) | Jitter (%) | Po (mW) |
| 1 | I-1 | 45 | 66 | 7.5 | 10.2 |
| 2 | I-2 | 50 | 76 | 6.6 | 9.7 |
| 3 | I-3 | 50 | 69 | 7.0 | 9.9 |
| 4 | I-4 | 50 | 68 | 6.7 | 9.5 |
| 5 | I-5 | 48 | 69 | 6.5 | 9.7 |
| 6 | I-1 + B-11 (ClO$_4^-$ salt)[1] | 55 | 73 | 7.8 | 10.2 |
| 7 | I-6 | 45 | 63 | 8.0 | 10.2 |
| 8 | I-7 | 44 | 64 | 8.5 | 10.2 |

[1]I-1: B-11 = 70:30 (molar ratio)

With respect to Sample Nos. 1 to 8, it is seen from results of Tables 1 and 2 that Sample Nos. 7 and 8 show somewhat high jitter values, but Sample Nos. 1 to 6 are satisfactory in all of reflectance, modulation and jitter. This is the same at both the recording linear velocities.

Sample Nos. 1 to 6 were further examined for light fastness. The light fastness was examined by exposing the disc to 80,000 lux for 40 hours under a xenon lamp (Xenon Fadeometer by Shimadzu K.K.), and measuring the jitter of the disc again.

As a result, Sample Nos. 1 to 8 showed no change of jitter.

Sample Nos. 1 to 8 were further subjected to a reliability test of 80° C., RH 80% and 100 hours.

As a result, Sample Nos. 1, 6 and 8 showed a slight increase of jitter, but Sample Nos. 2 to 5 and 7 showed no deterioration of the characteristics.

It is seen that especially favorable results are obtained from the salt forming dye with the dye cation of formula (II).

Comparative Example 1

A disc sample was fabricated as in Example 2 except that an azo compound (T1) was used. This is designated Sample No. 21.

A disc sample was fabricated as in Example 2 except that a 1:1 (molar ratio) mixture of the azo compound (T1) and the cyanine dye was used. This is designated Sample No. 22.

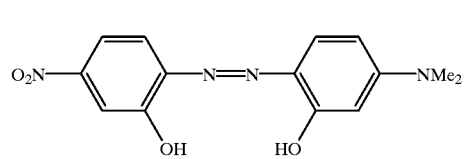

T1

These samples were examined by a read test and a light fastness test as in Example 2.

The results are summarized in Table 3.

It is evident that on recording at a linear velocity of 3.5 m/s, the azo compound provided insufficient electric characteristics. As to recording at a linear velocity of 7.0 m/s (double velocity recording), evaluation was impossible.

In the light fastness test, both the samples deteriorated and became impossible to evaluate.

Comparative Example 2

An attempt was made to fabricate a disc as in Example 2 using a salt-forming dye of an azo metal complex with a cyanine dye as shown below, but failed because of short solubility.

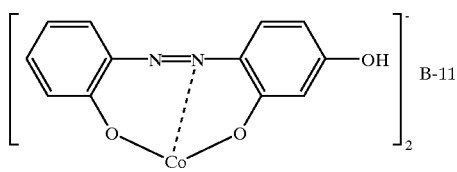

Comparative Example 3

A disc sample was fabricated as in Example 2 using a salt-forming dye of an azo metal complex with a Rhodamine dye as shown below. Recording was done at a linear velocity of 3.5 m/s, but failed because of short sensitivity.

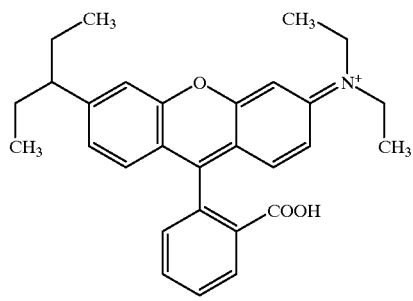

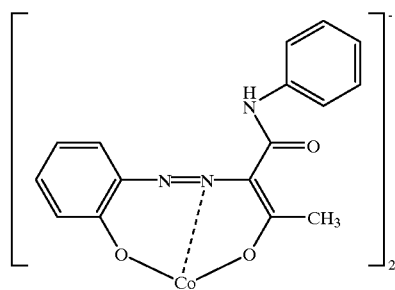

Comparative Example 4

A disc sample was fabricated as in Example 2 using a salt-forming dye of an azo dye with a cyanine dye as shown below, and similarly evaluated. The results of this sample No. 23 are shown in Table 3.

Recording was satisfactorily done at a linear velocity of 3.5 m/s, but failed at a linear velocity of 7.0 m/s because of short sensitivity.

TABLE 3

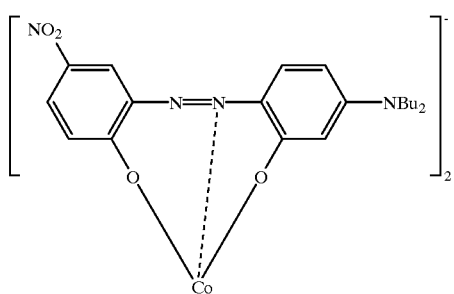

B-8

3.5 m/s reading (635 nm writing, 650 nm reading)

| Sample No. | Writing linear velocity (m/s) | Rtop | Mod (%) | Jitter (%) | Po (%) |
|---|---|---|---|---|---|
| 21 (comparison) | 3.5 | 25 | 56 | 28.7 | 12.2 |
|  | 7.0 | — | — | — | — |
| 22 (comparison) | 3.5 | 40 | 60 | 18.0 | 12.0 |
|  | 7.0 | — | — | — | — |
| 23 (comparison) | 3.5 | 50 | 60 | 6.6 | 10.9 |
|  | 7.0 | — | — | — | — |

Example 3

Samples (Table 4) were fabricated as in Example 2 except that dyes or dye mixture as shown in Table 4 were used as the dye for the recording layer. It is noted that Sample No. 31 in Table 4 used a dye mixture of Dye Compound I-2 having the compound of formula (I) as the ligand and a cyanine dye of formula (II) ($ClO_4^-$ salt of B-2) in a mixing ratio of 70:30 as expressed by the molar ratio of the dye compound having the compound of formula (I) as the ligand to the cyanine dye.

The disc samples thus fabricated were evaluated as in Example 2 by recording signals at a linear velocity of 3.5 m/s or 7.0 m/s with a laser beam of 657 nm, and thereafter, reading the signals at a linear velocity of 3.5 m/s with a laser beam of 650 nm. The results are shown in Tables 4 and 5.

TABLE 4

3.5 m/s writing, 3.5 m/s reading
(657 nm writing, 650 nm reading)

| Sample No. | Dye | Rtop | Mod (%) | Jitter (%) | Po (mW) |
|---|---|---|---|---|---|
| 31 | I-2 + B-2 ($ClO_4^-$ salt)[2] | 50 | 65 | 7.0 | 9.0 |
| 32 | I-4 | 50 | 61 | 7.1 | 9.3 |
| 33 | I-5 | 48 | 64 | 7.6 | 8.5 |
| 34 | I-10 | 52 | 65 | 8.0 | 8.7 |
| 35 | I-18 | 50 | 66 | 7.5 | 8.0 |

[2]I-2: B-2 = 70:30 (molar ratio)

TABLE 5

| Sample No. | Dye | Rtop | Mod (%) | Jitter (%) | Po (mW) |
|---|---|---|---|---|---|
| | 7.0 m/s writing, 3.5 m/s reading (657 nm writing, 650 nm reading) | | | | |
| 31 | I-2 + B-2 (ClO$_4^-$ salt)[2] | 50 | 70 | 7.0 | 12.0 |
| 32 | I-4 | 50 | 65 | 7.3 | 12.4 |
| 33 | I-5 | 48 | 72 | 7.2 | 12.0 |
| 34 | I-10 | 52 | 73 | 8.0 | 12.3 |
| 35 | I-18 | 50 | 75 | 7.8 | 11.5 |

[1]I-2: B-2 = 70:30 (molar ratio)

It is evident from Tables 4 and 5 that writing and reading are possible at both the linear velocities. Light fastness and reliability tests were carried out as in Example 2 to find no loss of characteristics.

BENEFITS OF THE INVENTION

The use of a metal azo complex having a satisfactory solubility as the light absorbing layer according to the invention provides an optical recording medium having improved characteristics including a good balance of recording sensitivity, reflectance and modulation, a high recording sensitivity, and a reduced jitter. Light fastness and reliability are improved especially when a salt-forming dye between a cation of a trimethinecyanine dye and an anion of a metal azo complex which is a chelate compound within the scope of the invention is used.

What is claimed is:

1. An optical recording medium capable of writing and reading operation with light having a wavelength of up to 690 nm, comprising a recording layer containing at least one chelate compound of a metal with a dye of the following formula (I):

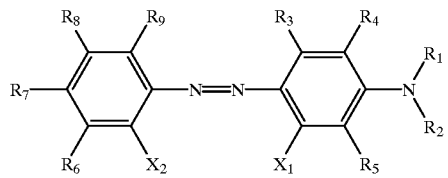

(I)

wherein each of $X_1$ and $X_2$ is independently a group having active hydrogen; each of $R_1$ and $R_2$ is independently selected from the group consisting of hydrogen, alkyl, aralkyl, aryl, and alkenyl groups, and $R_1$ and $R_2$, taken together, may form a ring; each of $R_3$, $R_4$, and $R_5$ is independently a monovalent group selected from the group consisting of hydrogen, alkyl, halogen, hydroxyl, carboxyl, carboxylic ester, sulfone, sulfonic ester, sulfamoyl, sulfonamide, carbamoyl, amide, amino, aryl, acyl, alkoxy, and alkenyl groups, and $R_3$ and $R_4$, taken together, may form a ring, or each pair of ($R_1$ and $R_4$) and ($R_2$ and $R_5$), taken together, may form a ring; each of $R_6$, $R_7$, $R_8$, and $R_9$ is independently a monovalent group selected from the group consisting of hydrogen, halogen, hydroxyl, carboxyl, sulfone, aryl, acyl, sulfonamide, amide, amino, cyano, nitro, mercapto, thiocyano, amino, alkylthio, alkylazomethine, carboxylic ester, carbamoyl, sulfonic ester, sulfamoyl, alkyl, alkoxy, aralkyl, and alkenyl groups, and each pair of ($R_6$ and $R_7$), ($R_7$ and $R_8$), and ($R_8$ and $R_9$), taken together, may form a ring;

with the proviso that in any one of the cases where (i) all $R_3$ to $R_9$ are hydrogen, (ii) $R_7$ is a nitro group, (iii) $R_3$ and $R_4$ form a benzene ring, and all $R_5$ to $R_9$ are hydrogen, (iv) all $R_3$ to $R_7$ are hydrogen, and $R_8$ and $R_9$ form a benzene ring, (v) $R_7$ is a halogen atom, and $R_3$ to $R_6$, $R_8$ and $R_9$ are monovalent groups as listed above, and (vi) $R_8$ is a nitro group, sulfamoyl group or halogen atom, and $R_3$ to $R_7$ and $R_9$ are monovalent groups as listed above; $R_1$ and $R_2$ are independently hydrogen, aralkyl, aryl or alkenyl groups, or one of $R_1$ and $R_2$ is an alkyl group and the other is hydrogen, aralkyl, aryl or alkenyl group, and $R_1$ and $R_2$, taken together, may form a ring.

2. The optical recording medium of claim 1 wherein the dye of the formula (I) is represented by the following formula (Ia):

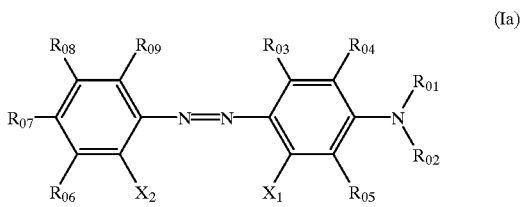

(Ia)

wherein each of $X_1$ and $X_2$ is independently a group having active hydrogen; each of $R_{01}$ and $R_{02}$ is independently hydrogen, alkyl or aryl group, and one of $R_{01}$ and $R_{02}$ is hydrogen or alkyl and the other is aryl, and $R_{01}$ and $R_{02}$, taken together, may form a ring; each of $R_{03}$, $R_{04}$, and $R_{05}$ is independently a monovalent group selected from the group consisting of hydrogen, alkyl, halogen, hydroxyl, carboxyl, carboxylic ester, sulfone, sulfonic ester, sulfamoyl, sulfonamide, carbamoyl, amide, amino, aryl, acyl, alkoxy, and alkenyl groups, and each pair of ($R_{01}$ and $R_{04}$) and ($R_{02}$ and $R_{05}$), taken together, may form a ring; $R_{06}$, $R_{07}$, $R_{08}$, and $R_{09}$ are independently monovalent groups selected from the group consisting of hydrogen, halogen, hydroxyl, carboxyl, sulfone, aryl, acyl, sulfonamide, amide, cyano, nitro, mercapto, thiocyano, amino, alkylthio, alkylazomethine, carboxylic ester, carbamoyl, sulfonic ester, sulfamoyl, alkyl, alkoxy, aralkyl, and alkenyl groups, at least one of $R_{07}$ and $R_{08}$ is a nitro or cyano group, and each pair of ($R_{06}$ and $R_{07}$) and ($R_{08}$ and $R_{09}$), taken together, may form a ring.

3. The optical recording medium of claim 1 or 2 wherein the recording layer further contains a dye having a maximum absorption wavelength in the range of 500 nm to 630 nm in a thin film state.

4. The optical recording medium of claim 3 wherein the recording layer contains a trimethinecyanine dye of the following formula (II):

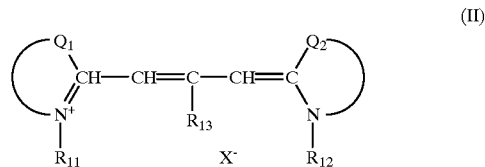

(II)

wherein each of $Q_1$ and $Q_2$ is a group of atoms necessary to form a heterocycle with the carbon and nitrogen atoms, the heterocyclic skeletons completed by $Q_1$ and $Q_2$ may be the same or different; $R_{11}$ and $R_{12}$ are each aliphatic hydrocarbon groups and may be the same or different; $R_{13}$ is hydrogen or a monovalent substituent; and $X^-$ is a monovalent anion.

5. The optical recording medium of claims 1 or 2 wherein the recording layer contains a salt-forming dye between a complex ion of the chelate compound of a metal with a dye of the formula (I) and an ion of a dye having a maximum absorption wavelength in the range of 500 nm to 630 nm in a thin film state.

6. The optical recording medium of claim 5 wherein the recording layer contains a salt-forming dye between a complex ion of the chelate compound of a metal with a dye of the formula (I) and an ion of a trimethinecyanine dye of the formula (II).

7. The optical recording medium of claim 3 wherein the trimethinecyanine dye of the formula (II) is an indolenine cyanine dye.

* * * * *